US010807019B1

(12) United States Patent
Marver et al.

(10) Patent No.: US 10,807,019 B1
(45) Date of Patent: Oct. 20, 2020

(54) GAS RECOVERY VALVE (71) Applicants: William H Marver, Evansville, IN (US); Matthew S Stone, Evansville, IN (US)

(72) Inventors: William H Marver, Evansville, IN (US); Matthew S Stone, Evansville, IN (US)

(*) Notice: Subject to any disclaimer, the term of this patent is extended or adjusted under 35 U.S.C. 154(b) by 0 days.

(21) Appl. No.: 16/140,687

(22) Filed: Sep. 25, 2018

Related U.S. Application Data (60) Provisional application No. 62/621,439, filed on Jan. 24, 2018.

(51) Int. Cl.
*B01D 19/00* (2006.01)
*E21B 43/34* (2006.01)
(52) U.S. Cl.
CPC .......... *B01D 19/0063* (2013.01); *E21B 43/34* (2013.01)
(58) Field of Classification Search
CPC .............................. B01D 19/0063; E21B 43/34
USPC ........................................................ 137/202
See application file for complete search history.

(56) References Cited

U.S. PATENT DOCUMENTS

| 3,112,191 A | * | 11/1963 | Anderson | F16K 24/04 |
| | | | | 96/200 |
| 4,696,321 A | * | 9/1987 | Reese | F16K 24/042 |
| | | | | 137/202 |
| 5,119,790 A | * | 6/1992 | Olson | F02M 37/0023 |
| | | | | 123/510 |

OTHER PUBLICATIONS

Original of GB 969050 A; Absolon, Eric William; Sep. 9, 1964.*

* cited by examiner

*Primary Examiner* — Paul J Gray (57) ABSTRACT

A valve assembly to extract gas, and thereby recover the gas, to be used or remediated at the well, and as a corrective action for wells slowing flow due to ongoing gas pressure accumulating in the flow lines. The valve assembly includes a container and a valve member disposed in the container. The valve member having an upper portion that includes a stop. The assembly is in a closed state when the stop is in sealing communication with an upper vent opening in the container, and in an open state, allowing for the capture of released gas, when the stop is spaced from the upper vent opening. The stop is guided along a vertical travel of the valve stem which is controlled by the rise and fall of fluid within the chamber.

8 Claims, 7 Drawing Sheets

GAS RECOVERY VALVE

CROSS REFERENCES TO RELATED APPLICATIONS

U.S. Provisional Application for Patent No. 62/621,439, filed Jan. 24, 2018, with title "Gas Lift Valve" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

The present invention relates to the field of flow control, and more particularly, to a device and method for controlling the flow of fluids, as they are produced from a well bore that, in one embodiment, provides for efficient removal and capture of gas from produced fluid, thereby resulting in more efficient, in some cases, increased fluid flow resulting in a more consistent production of oil. In some low volume wells with gassy oil, an actual increase in the production and delivery of oil to stock tanks has occurred.

2. Brief Description of Prior Art

Methane emissions from oil and gas production and distribution is a widespread problem that persists up and down the supply chain. As oil is produced, a portion of associated or by-product gas is commonly vented or wasted in flares, resulting in the release of a substantial amount of methane. The increase in both petroleum production and the intentional wasting (venting) of the associated gas contributes to increasing atmospheric concentrations of methane. The present invention addresses methane emissions that are intentionally vented and unintentionally leaked.

The economic climate of the petroleum industry demands that oil companies continually improve their recovery systems to reduce or eliminate methane (gas) emissions into the atmosphere and to produce oil more efficiently and economically from sources that are becoming increasingly difficult to exploit without increasing the cost to the consumer. When a newly drilled well or an old well is opened up on land, the oil/gas under pressure is driven to the surface and preferably directed to a flow line. At the surface, the oil/gas is released to a low pressure environment allowing the gas and oil to separate. Because gas compresses, stretches, and is inclined to occupy higher areas within an enclosure than oil, difficulty operating a hydraulic delivery of fluid consistently to stock tanks are encountered much more often than realized. The present invention provides a means to purge the gas and provide for a stable hydraulic delivery of oil to stock tanks.

The present invention accepts the fact that there are unknown volumes and quantities of pressure encountered in individual oil bearing zones and reservoirs. Pressure caused due to gasses during the oil production operation are indeed difficult to confine, control, and often, even detect.

The problem stems from natural gas being innate inside of produced live oil. Oil, and the gas contained in it, are pumped to the surface and delivered to flow lines. As the fluids approach the surface, gas begins to break out of the oil. Flow line gas has only one exit, bubbling up through the fluids in the separator. Gas will resist being pushed downward and accumulates in the higher portions of the flow line. Oil will flow downward in the open space created by the accumulation of gas. The oil will seek its own level below surface in the flow line, forming traps of oil, sealing up the travel of gas in a fashion referred to as "P" traps. The oil accumulates as the gas builds pressure behind it. Each time more gas is added behind the fluid, the fluid is pushed a little further through the trap. Eventually, the fluid will be pushed through the trap and the gas finds a path to expand. This relieves the build-up of pressure. The gas expanding as it pushes fluid out of the trap is a violent release of pressure. This creates turbulence. The turbulence releases more gas from the oil.

This process will repeat inside the flow line, until the gas has enough energy to rush into the separator and out the bottom of the flume. At this point, the Inventor has found that when you are close enough to the separator, you can hear a sudden rush of bubbles inside the separator. In some cases, this is when all of the day's production is suddenly arriving into the separator, adding to and lifting the oil pad so the excess can overflow to the stock tank. As such, rather than a constant stream of oil production into the stock tank, the oil is forcefully delivered periodically, and all at once to the separator and from the separator to the stock tank. Other wells may maintain a constant flow of fluids to the tank battery but will have surges and sudden releases of gas and oil into the separator.

The gas bubbling inside the separator causes multiple problems. The bubbles float upward, with quantity and speed great enough to break through the water column, burst into the oil pad, and percolate into the atmosphere. This pushes the heavier, dirtier oil particles located closer to the oil/water interface upward in a stirring motion. The particles of oil in the oil pad that are heaviest will stir downward through the water column. In the mixing of these heavier, dirtier particles of oil into the water, some will be sucked into the siphon line and end up being a pad of oil on top of water in the water tank. As the dirtier particles of oil are added to the pad, they will fall through the water, and some will end up in the filters of the injection system, or inside the injection pump, or worse, inside the injection well.

Further, the entire oil pad is disturbed by the gas exploding into the separator. There is fresh oil flowing upward from the bottom of the flume, upward through the water column under the oil pad in a very unnatural quantity to the expected stable environment of the oil pad. Not only does the quantity of oil representing the day's production go to the stock tank, but so does much of the oil that comprises the oil pad for the prior 24 hour period. Not only is the new oil going to the stock tank, so is the older, dirtier oil.

The surge of fluid and gas into the separator is so sudden and disruptive, a stirred up portion of the oil pad is often pushed over to the stock tank. This carries with it the impurities that would have existed in the separator's oil pad when operating in a stable fashion. These impurities, in time, contribute to the accumulation of tank bottoms. Again, the Inventor has found that these problems can be reduced or eliminated when a stable environment exists within the production system causing a constant flow into the stock tank.

Because of these conditions, and having in mind the high cost and risk to the environment, there is an extreme need to face and effectively deal with this reality. Considering the hundreds of thousands of the previously drilled wells around the world, there is a dire need for a new device and positive solution for applying a corrective action for the problems of unflared gas at the tank battery and surging fluid and gas flow at the separator.

The present invention presents a solution to these concerns in a cost effective way to avoid these problems for both newly drilled and previously drilled wells. The invention provides a device to effectively and efficiently extract gas from the production flow line at the well, and maintain consistent flow of fluid at the separator while greatly reducing gas venting at the tank battery. The inventor has found the present invention to deliver the following benefits:

1. An efficient and effective extraction of gas from the flow line at the well site;
2. Stabilizes the oil pad and water column inside the separator;
3. Reduces the amount of oil pad known to form on top of water in the water tank;
4. Reduces the amount of trashy, dirty oil particles that accumulate in the stock tank;
5. Eliminates noisy gas bubbling in the separator;
6. Eliminates surging, spotty, belching oil production;
7. Stabilizes oil production to a constant, steady stream 24 hours a day;
8. Allows gas extracted at well to be reintroduced into casing to create a gas positive pressure, inhibiting oxygen invasion;
9. Greatly reduces or eliminates the need for purchase of propane for the operation of combustion engine, even if pumping below a packer;
10. Greatly reduces the methane emissions at the tank battery;
11. Provides a "shock absorbing" effect for flow line;
12. Reduces oily residue carry over in water to the water tank, prematurely causing filter changes on injection systems;
13. The reduction/elimination of gas in the separator may enable a much smaller diameter separator to be used to handle the same amount of fluid; and
14. Decreases paraffin accumulation in flow lines and stock tanks.

SUMMARY OF THE INVENTION

A gas recovery valve used to extract gas (methane) at the well, and as a corrective action for the problem of wells slowing or inconsistent flow due to gas pressure accumulating in the flow lines. The valve assembly includes a pressurizable container and a valve member disposed in the container. The valve member is actuated by a valve stem. An upper portion of the valve includes a stop that defines the upper-most surface of the upper portion.

The gas recovery valve is in a closed operational state when the stop is seated against an upper vent opening disposed in the upper-most side of the container, and an open operational state when the stop is spaced from the upper vent opening. The stop is guided along the vertical travel of the valve stem. The valve stem is raised and lowered with the movement of a float which is generally controlled by the rise and fall of fluid within the chamber.

In the closed state, the stop becomes a seal that communicates with and obstructs the upper vent opening, providing for sealing pressure within the container, not allowing gas to escape through the upper vent opening.

The upper vent opening is in fluid communication with the outside of the container and, when the valve is in the open position, the upper vent opening is also in fluid communication with the fluid (and gas) in the container.

A gas recovery line may be appropriately connected to a threaded portion extending from the upper vent opening. As gas is released through the upper vent opening, the gas flows through the gas recovery line and can be directed to various applications including, but not limited to:

the gas may be directed to a gas gathering system;
the gas may be reintroduced into the well bore that may create a natural gas abundance large enough to inhibit oxygen invasion;
the gas may be used to operate the combustion engine powering the well thereby reducing the propane expense to operate the combustion engine; and/or
the gas may be directed to a flare at the well site.

DESCRIPTION OF THE PREFERRED EMBODIMENT

The present invention is directed to a valve assembly that is used to reduce or eliminate methane (gas) emissions from escaping and entering the atmosphere at the tank battery by recovering the methane at the well, and as a corrective action for the problems caused by gas pressure accumulating and discharging in the flow lines. The valve assembly utilizes the accumulation of gas in the container to lower the liquid level in the container to open the valve assembly, and as gas is released, the liquid level in the container raises, which temporarily closes the valve assembly. As will be described, the gas recovery valve assembly of the present invention consists of components configured and correlated with respect to each other so as to attain the desired objective.

Figure 1:
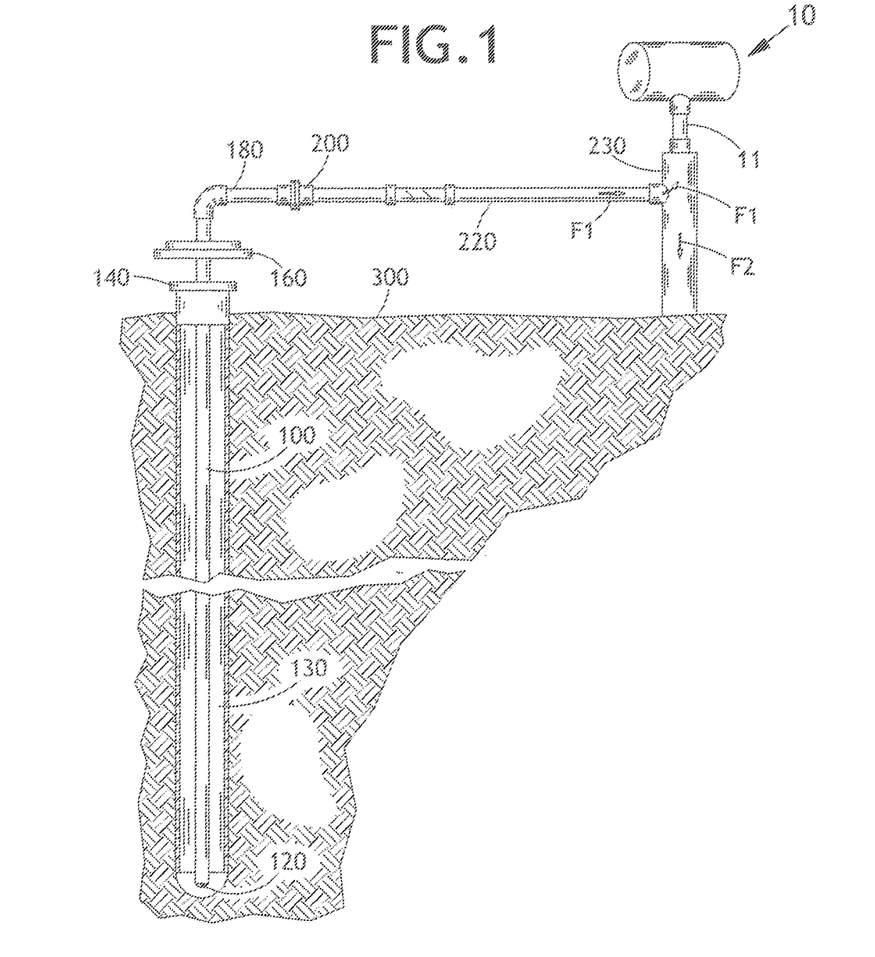
FIG. 1 is a schematic view of a simplified well drilling arrangement incorporating the present invention, a gas recovery valve.
Figure 2:
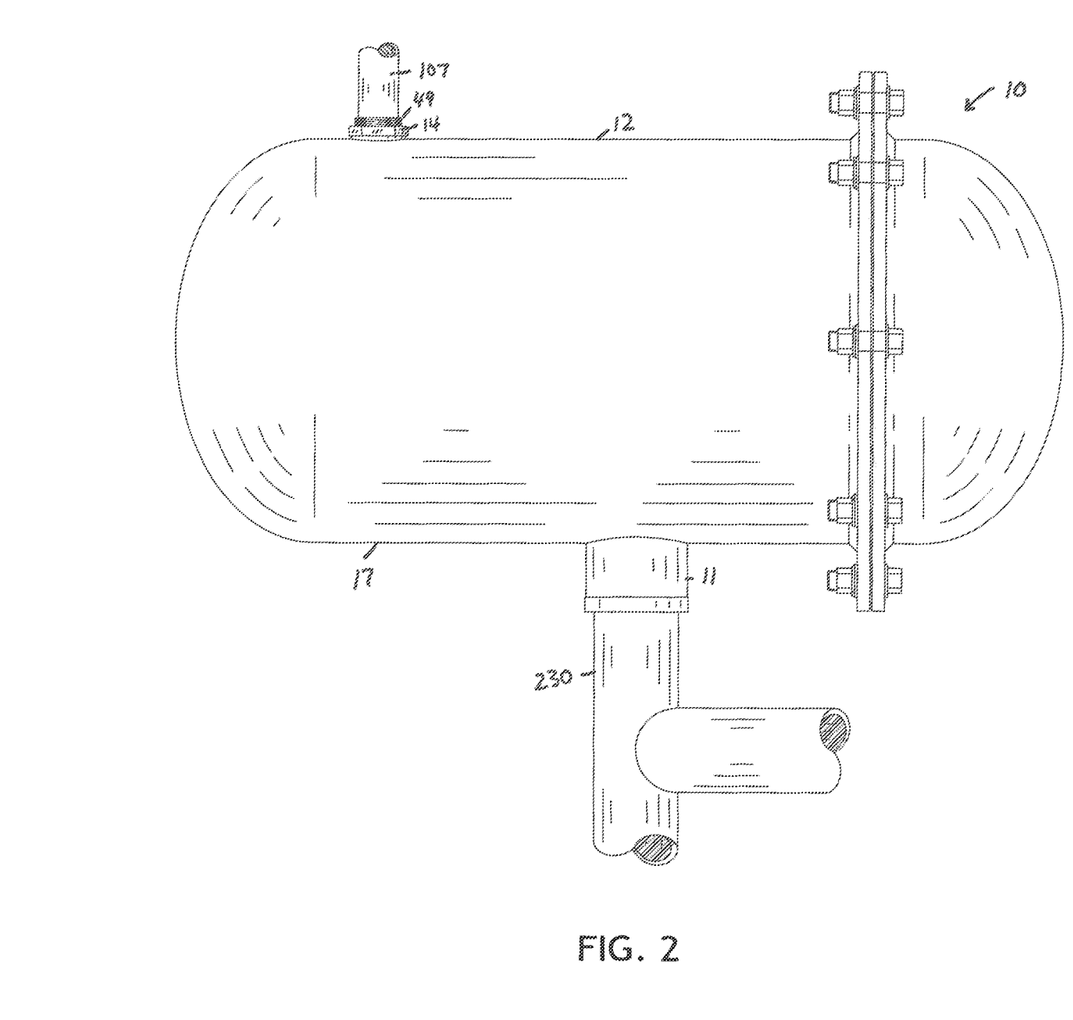
FIG. 2 is a side view of the gas recovery valve illustrated in FIG. 1.

Referring to FIG. 1, a simplified typical well production arrangement is illustrated which employs a production string 100 having a pump 120 at the lower end. The well bore 130 produced by the drilling operation is illustrated as extending a substantial distance below the surface 300. The production string extends up through well head 140 to a pumping tee 160 and towards flow lines. Connected to the pumping tee is a pipe 180 extending from the pumping tee 160 to pipe 220. As will be described, pipe 220 places pipe 180 in fluid communications with a vertical section of flow line 230 and the valve assembly 10 of the present invention. Pipe 220 continues fluid flow from the valve assembly 10 to a fluid storage location (not shown). For purposes herein, flow line or any other line carrying fluid or gas may be referred to as "conduit."

The process described thus far (excluding introduction of the present valve assembly 10) functions in the usual manner for producing and directing fluids generated in a well bore to the surface, and then to the fluid storage location. It will be understood that because the drilling application within the well bore as well as the subsequent delivery of fluid from the well bore to the pipes, flow lines, and other components do not form a part of the present invention, the details of such treatment steps are not described. It should also be understood that although only a single well bore has been shown for the sake of convenience, application of the present invention may involve as many of these elements as may be necessary to handle the required volumes of materials.

As best shown in FIG. 1, the valve assembly 10 is disposed on top of a vertical section of flow line 230 that is downstream from the surface valve 200 or other valve (back pressure valve, check valve, etc.) (if present) and as illustrated, in fluid communications with pipe 180 and pipe 220. More particularly, pipe 180 directs fluid between the approximate pumping tee portion to the surface valve 200 (if present), and pipe 220 between the surface valve and the vertical section of flow line 230. As illustrated, the valve assembly 10 includes a flow line connector 11 that is appropriately connected to the flow line 230. The connector 11 and flow line are perpendicular to pipes 180, 220.

The valve assembly 10 includes a pressurizable container 12 that defines a chamber 13, with a valve member 14 appropriately connected to an upper-most side 15 of the container 12 within the chamber 13. The valve member 14 is generally defined by a valve stem 16 and an upper portion 18 that upwardly extends from the top end 16a of the valve stem 16. As will be further discussed, the upper portion 18 includes a stop 19 that defines the upper-most surface of the upper portion 18.

As illustrated, the flow line connector 11 downwardly extends from a lower-most side 17 of the container 12. The flow line connector 11 is in fluid communications with the chamber 13. As will be discussed, and as illustrated, oil (and gas) flows F1 through the pipe 220 through the flow line connector 11 into the chamber 13. And, the fluid flows F2 from the chamber 13 to the fluid storage location (not shown) from the flow line connector 11.

Figure 5:
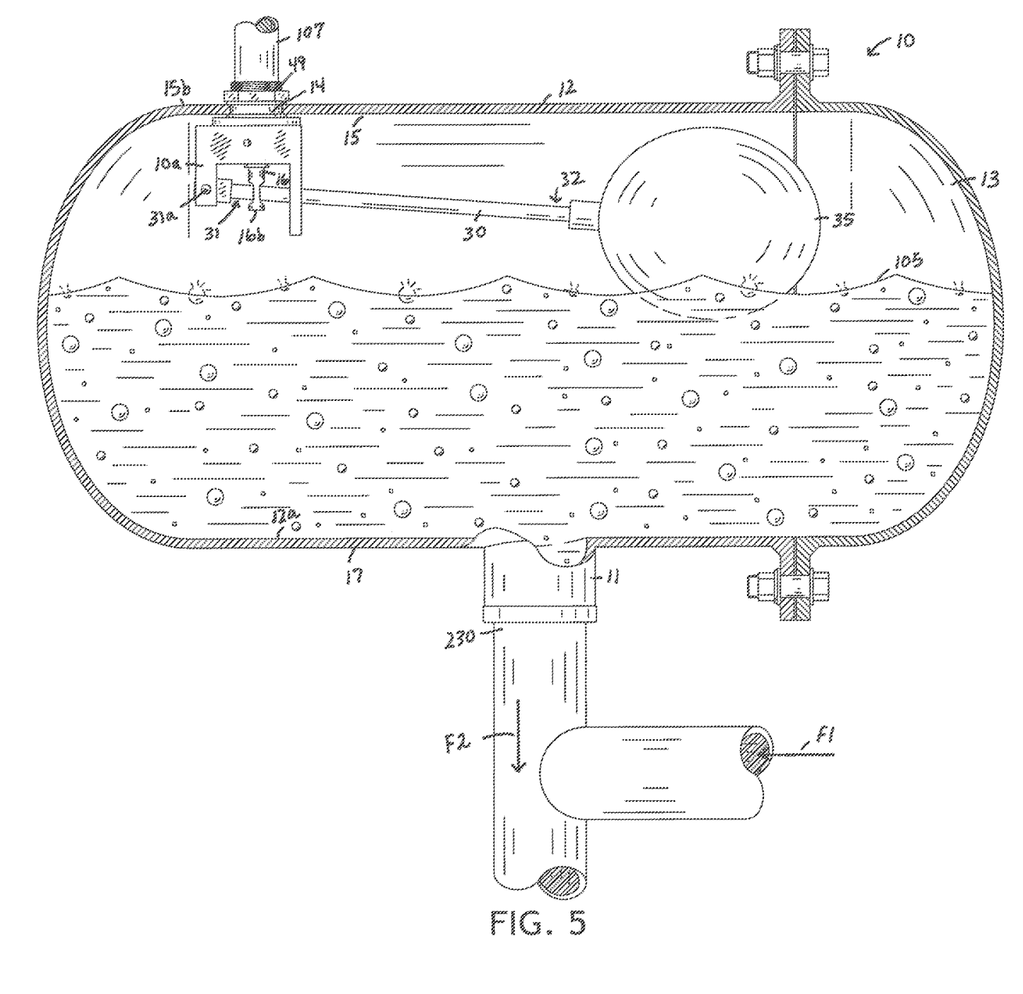
FIG. 5 is a sectional view of the gas recovery valve shown in FIG. 2 with the valve member in a closed position.
Figure 6:
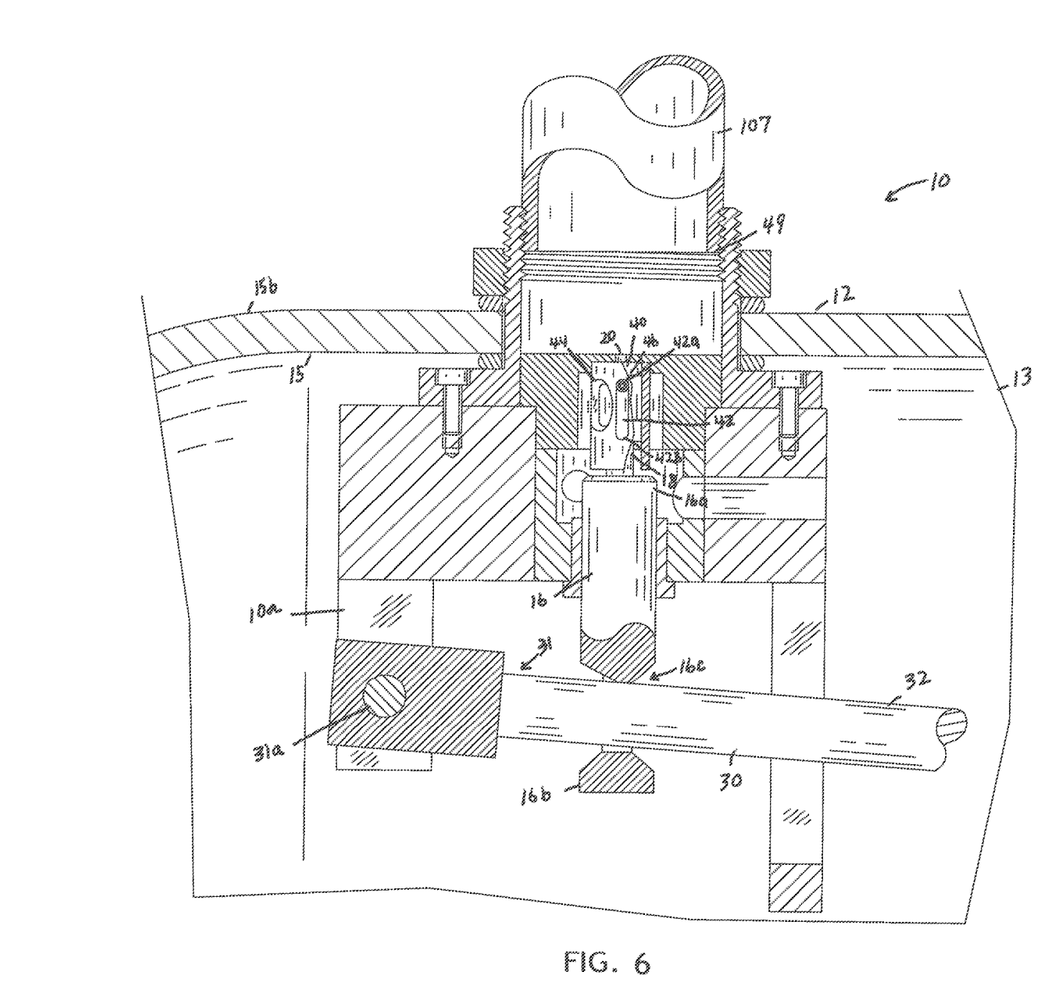
FIG. 6 is an enlarged, sectional view of the valve member illustrated in FIG. 5 (closed position).
Figure 7:
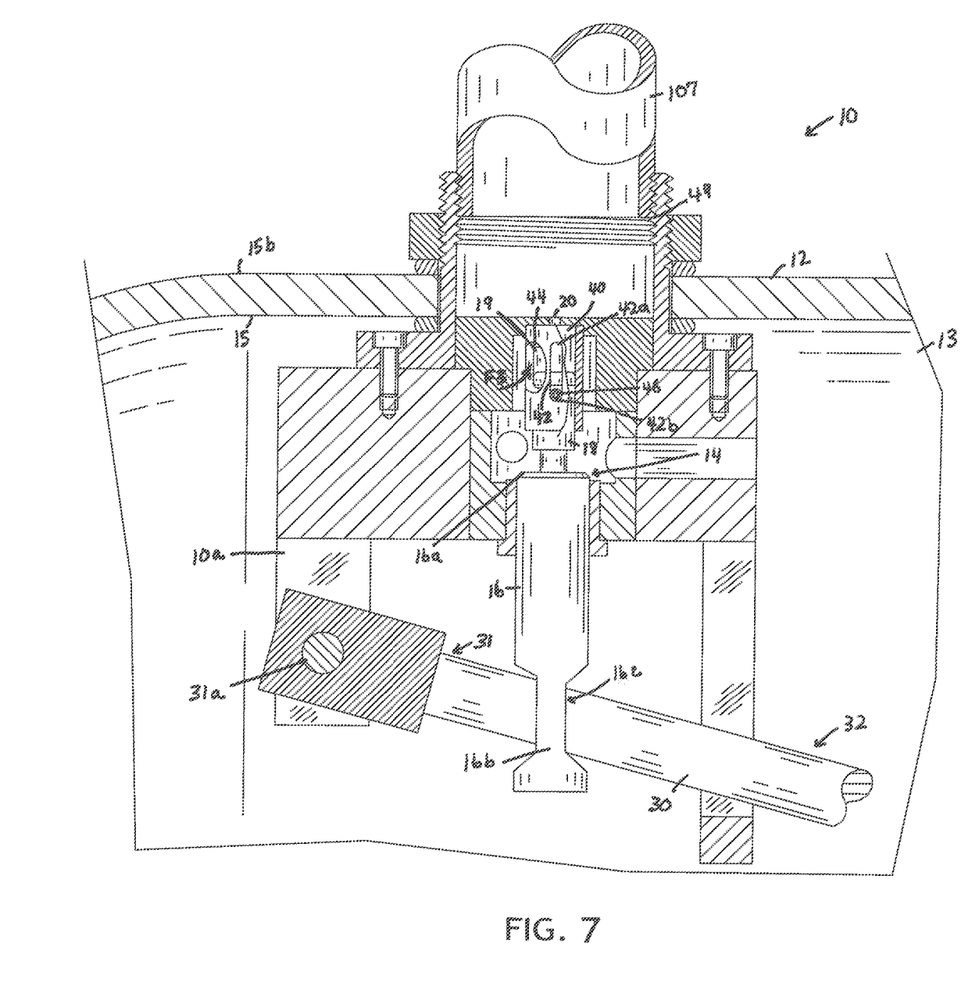
FIG. 7 is an enlarged, sectional view of the valve member illustrated in FIG. 4 (open position).

As will be understood, the gas recovery valve 10 being in a closed operational state (as shown in FIGS. 5 & 6) when the stop 19 is in sealing communication with an upper vent opening 20 disposed in the upper-most side of the container 12, and an open operational state when the stop 19 is spaced (not in communications) with the upper vent opening 20 (as shown in FIGS. 5 & 7). As will be further described, the stop 19 is guided along the vertical travel of the valve stem 16 which is generally controlled by the rise and fall of liquid 105 within the chamber 13. In the closed state, the stop 19 becomes a seal that communicates with and obstructs the upper vent opening 20, providing for sealing pressure within the container 12, not allowing gas to escape through the upper vent opening 20.

In some applications, the pressure in the conduit 180 is controlled by the back pressure valve and communicates with the valve assembly 10 by means of the conduit 220 there between. Should the fluid/gas pressure in the conduits be too high the back pressure valve may open and fluid/gas will flow through the conduit 180. However, Applicant has found that application of a back pressure valve alone, does not always remedy the problem and despite the back pressure application, the process may still experience an unsteady flow as previously discussed. In particular, Applicant has found that when gas accumulates in the flow line, and resists being pushed down, this causes an inefficiency in the conduit's ability to maintain or bring more fluid into the flow lines. The present valve assembly 10 is disposed downstream from the back pressure valve and remedies the described problem.

Valve assembly 10 is operable to control the volume of gas and gas pressure build-up within the described process. In application, gas rises and accumulates into the chamber 13 rather than in the flow lines. When gas accumulates in the chamber 13 causing the liquid level to fall, the valve 10 will mechanically transition to its open operational state. In the open operational state, fluid flows F1 into the chamber 13 through the flow line connector 11. In the chamber 13, gas and oil continue to separate with the gas rising and the oil continuing to flow into F1 and back out F2 of the chamber 13. As the gas within the chamber 13 is vented to outside the chamber 13 through upper vent opening 20, the release of pressure within chamber 13 allows the oil from the flow lines to rise into the chamber 13 via the vertical riser connection 11. The accumulation of oil in the chamber 13 urges the float 35 upward until the stop 19 abuts the upper vent opening 20. The valve 10 is then in the closed operational state.

In the closed state, the gas is inhibited from escaping through the upper vent opening 20 enough such that the gas accumulation within the chamber 13 will force oil down and out of the chamber 13 as described. As the gas pushes the oil out of the container 12, the remaining oil within the chamber 13 at some point will no longer hold the float 35 upward in the closed position until the stop 19 is released from the upper vent opening 20 and the valve 10 is in the open position allowing gas within the chamber 13 to again vent.

This process described of the valve 10 changing from the open state to closed, and back to open, continues to repeat itself as gas continues to pass through and/or accumulate in the chamber 13 and not in the flow lines.

Valve assembly 10 is operable to control the volume of gas pressure build-up within the conduits. When in the open state, fluid flows into the chamber 13. In the chamber 13, gas and oil separate with the gas moving outside of chamber 13 through upper vent opening 20. Gas exiting chamber 13 reduces the gas pressure and allows the encroachment of produced oil into chamber 13. As the gas pressure within the chamber 13 decreases, the encroachment of new oil into chamber 13 pushes the float 35 upward until the valve is in the closed position, and the oil continues to flow through the conduit in the direction designated as F1.

In the closed state, the gas can no longer escape through the upper vent opening 20, and the gas accumulation within the chamber 13 further forces oil down and out of the chamber 13 and flow F2 through the flow line connector 11 as described. As the gas pushes the oil out of the chamber, the oil will no longer hold the valve stem 16 in the closed position until the valve stem drops to the open position allowing the gas to again vent.

The upper vent opening 20 is in fluid communication with the atmosphere outside of the container 12 and as will be understood, when the valve 10 is in the open position, the upper vent opening 20 is also in fluid communication with the fluid (and gas) in the chamber 13. In the preferred embodiment, a hollow sleeve 40 is in fluid communication with the upper vent opening 20 and downwardly extends into the chamber 13 from the interior surface 15a of the upper-most side 15. The hollow sleeve 40 is sized and shaped to receive the upper portion 18 of the valve member 14. As illustrated, the sleeve 40 includes a first elongated aperture 42 and a second aperture 44 that is preferably disposed between the first aperture 42 and the interior surface 15a of the chamber 13. A pin member 46 extends through the first aperture 42 and is appropriately attached to the upper portion 18.

The first aperture 42 defines an upper edge 42a and a lower edge 42b. The distance between the upper edge 42a and lower edge 42b represents the distance the valve stem 16 is able to vertically travel.

When the pin member 46 abuts (is stopped by) the upper edge 42a (see FIG. 6), the valve stem 16 is at its upper-most point and the stop 19 is in communication with the upper vent opening 20, i.e., the valve is in the closed position. Similarly, urging the pin member 46 towards the lower edge 42b releases the seal between the stop 19 and upper vent opening 20, placing the valve 10 in the open position.

As further illustrated, when the valve stem 16 is raised to the closed position as described, the upper portion 18 is positioned to block the flow of gas through the second aperture 44. When the valve 10 is in the open position, the upper vent opening 20 is in fluid communication with the gas inside the chamber 13. When the valve stem 16 and more particularly the upper portion 18 is lowered, a gas flow path F3 is created through the second aperture 44 to the upper vent opening 20 allowing gas to escape from the chamber 13 through the second aperture 44 and through the upper vent opening 20.

In the preferred embodiment, a threaded portion 49 extends from the exterior surface 15b of the upper-most side 15. A gas recovery line 107 may be appropriately connected to the threaded portion 49. As gas is released through the upper vent opening 20 as discussed, the gas flows through the gas recovery line and can be directed to various applications including, but not limited to:

the gas may be directed to a gas gathering system;
the gas may be reintroduced into the well bore that may create a natural gas abundance large enough to inhibit oxygen invasion;
the gas may be used to operate the combustion engine powering the well thereby reducing the propane expensed to operate the combustion engine; and/or
the gas may be directed to a flare at the well site, thereby using standard oil field methods to convert methane to carbon dioxide.

Figure 3:
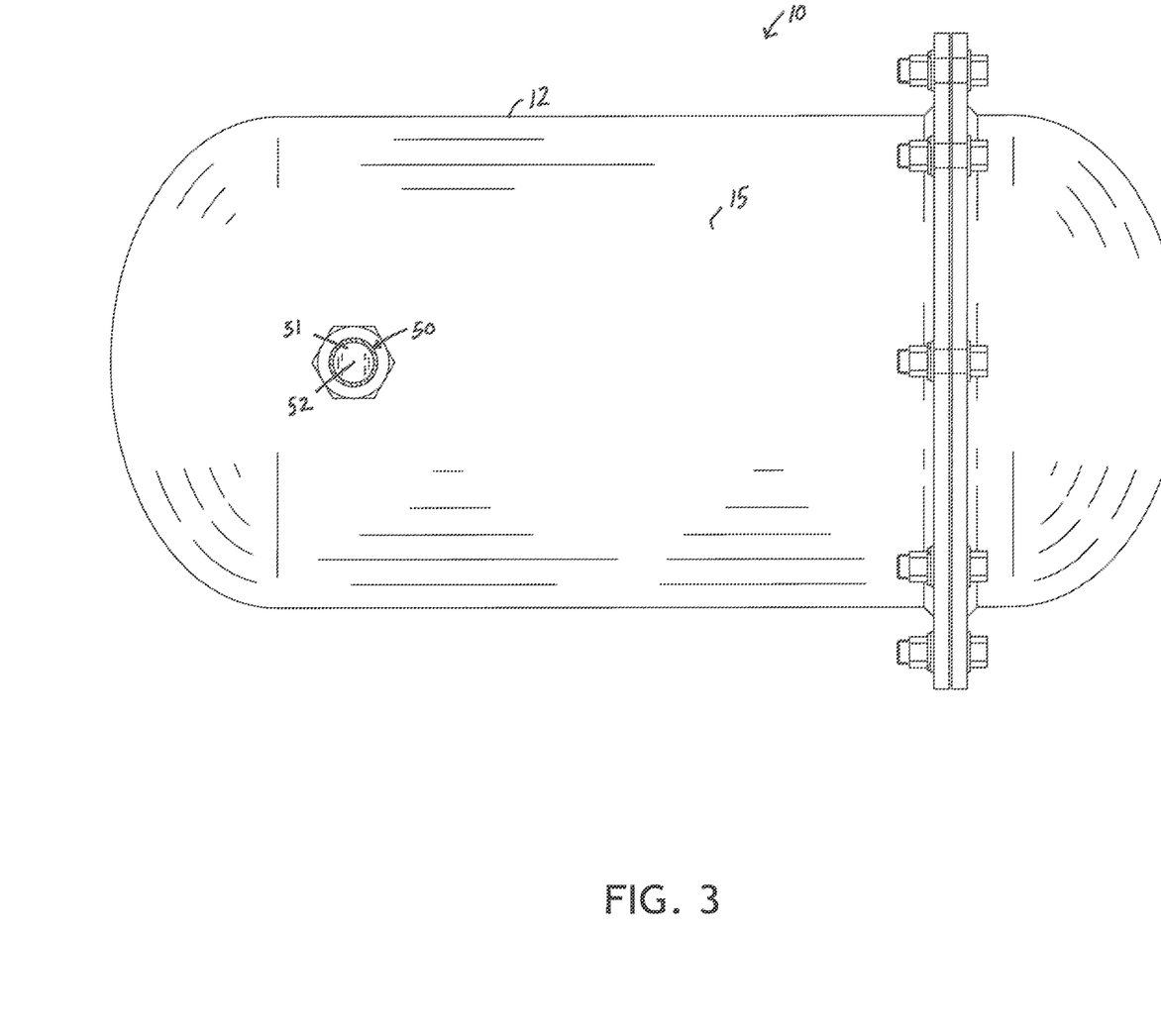
FIG. 3 is a top view of the gas recovery valve shown in FIG. 2.
Figure 4:
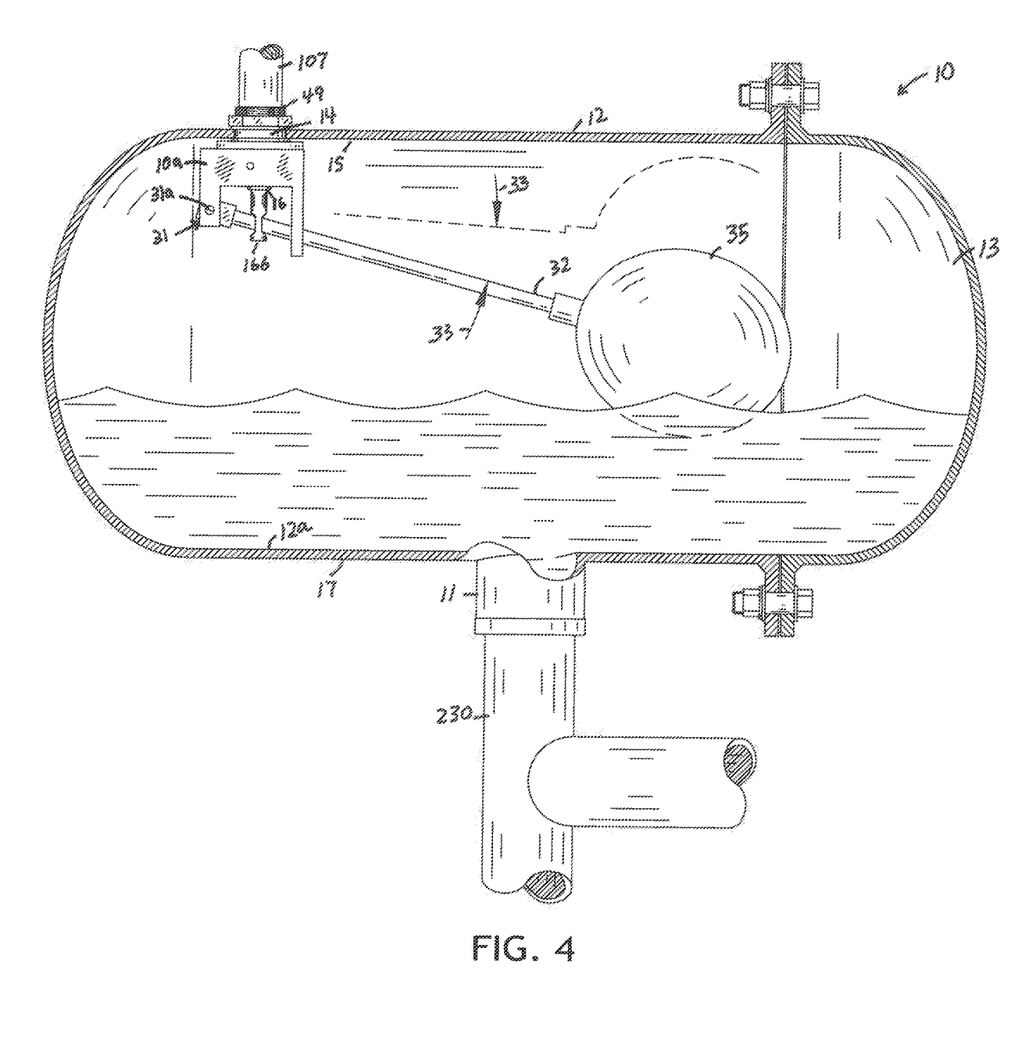
FIG. 4 is a sectional view of the gas recovery valve shown in FIG. 2 with the valve member in an open position.

As best shown in FIG. 3, threaded portion 49 defines a central opening 50 that is in fluid communications with the upper vent opening 20. Preferably, the central opening 50 includes a seal member 51 that defines a sized aperture 52 to allow the flow of gas therethrough. As is known, the preferred sized aperture 52 may correspond with the desired flow rate.

As illustrated, the valve 10 further includes a rod 30 having a first end 31 that passes through an aperture 16c preferably disposed in a lower portion 16b of valve stem 16 and is pivotally mounted 31a to an extending arm 10a of the valve assembly 10. The rod 30 is generally perpendicular to the vertical length of valve stem 16. A buoyant float 35 is attached to a second, free end 32 of the rod 30. The rod 30 for pivotal movement 33 with the rise and fall of fluid within the chamber 13. An advantage of using the rod 30 is to increase the force with which valve stem 16 rises and drops thereby moving stop 19 into or out of contact with upper vent opening 20. Float 35 has a buoyancy and a weight sufficient to mechanically assist the vertical upward movement of the valve stem 16 as previously discussed, and enough weight to overcome the pressure within the container which would otherwise hold the stop 19 against the vent opening 20. It should be understood that without enough force to overcome the internal pressure of the container 12, once the valve stem 16 has traveled vertically upward placing stop 19 in communication with upper vent opening 20, until stop 19 is pulled away from upper valve opening 20, there will be no fluid communication from inside container 12 to any conduit above the container's upper surface 15. The translational movement of the float 35 caused by the volume of fluid, the buoyancy of the float 35, and the weight of the float 35 results in movement/rotation of rod 30 upward and downward causing translational movement of the valve stem 16.

In the preferred embodiment, the container 12 is constructed of stainless steel. The stop 19 that defines the upper-most surface of the upper portion 18 is preferably constructed of a strong synthetic rubber designed to withstand hydrocarbons, acid, solvent, saltwater, cold and any heat up to 180° F. and pressures up to 100 psi. The Inventor has found the product commercially known as VITON which is a trade name or mark used in commerce, owned by The Chemours Company.

Although the above description contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

It would be obvious to those skilled in the art that modifications may be made to the embodiments described above without departing from the scope of the present invention. Thus the scope of the invention should be determined by the appended claims in the formal application and their legal equivalents, rather than by the examples given.

We claim:

1. A valve assembly comprising:
a pressurizable container that defines a chamber,
a valve member disposed within the chamber, said valve member defined by a valve stem having an upper portion that upwardly extends from a top end of the valve stem, said upper portion includes a stop that defines an upper-most surface of said upper portion,
a vertical flow line that downwardly extends from a lower-most side of the container and wherein said vertical flow line is in fluid communications with said chamber, said valve assembly being in a closed operational state when said stop is in sealing communication with an upper vent opening disposed in said container, and said valve assembly being in an open operational state when said stop is spaced from said upper vent opening, wherein said stop is guided along the vertical travel of said valve stem which is controlled by the rise and fall of fluid within the chamber, a hollow sleeve is in fluid communication with the upper vent opening and downwardly extends into the chamber from an interior surface of an upper-most side of said container, said hollow sleeve is sized and shaped to receive said upper portion of said valve stem, said sleeve includes a first elongated aperture and a second aperture, a pin member extends through said first aperture and is attached to said upper portion, and wherein said first aperture defines an upper cylindrical edge and a lower cylindrical edge, and wherein a distance between said upper and lower cylindrical edges represents the distance said pin member and said valve stem is able to vertically travel, and when said pin member abuts the upper cylindrical edge, said valve assembly is in the closed position and said upper portion is positioned within said sleeve to block a flow of gas from inside the chamber passing through the second aperture, and when said pin member moves to said lower cylindrical edge said valve assembly is in the open position allowing the gas to escape from inside said chamber through said second aperture and through said upper vent opening, a threaded portion upwardly extends from an exterior surface of said upper-most side, said threaded portion configured for connecting a gas recovery line to capture gas flowing through said upper vent opening.

2. The valve assembly of claim 1, wherein said threaded portion defines a central opening having a seal member that defines a sized aperture to allow the flow of gas therethrough, and wherein said central opening is in fluid communications with said upper vent opening.

3. The valve assembly of claim 2, further including a rod having a first end that passes through an aperture disposed in a lower portion of said valve stem and is pivotally mounted to an extending arm of said valve assembly and a free end of said rod attached to a buoyant float, wherein said float will rise and fall with the level of fluid within the chamber.

4. A valve assembly comprising:
a container that defines a pressurizable chamber,
a valve member disposed within the chamber, said valve member defined by a valve stem having an upper portion that includes a stop at an upper-most surface of said upper portion,
a vertical flow line that downwardly extends from a lower-most side of the container and wherein said vertical flow line is in fluid communications with said chamber, said valve member being in a closed operational state when said stop is in sealing communication with an upper vent opening disposed at an uppermost side of said container, and said valve member being in an open operational state when said stop is spaced from said upper vent opening, and wherein said stop is guided along the vertical travel of said valve stem which is controlled by the rise and fall of fluid within the chamber,
a hollow sleeve is in fluid communications with said upper vent opening and downwardly extends into the chamber from an interior surface of an upper-most side of said container, said hollow sleeve is sized and shaped to receive said upper portion of said valve member, said sleeve includes a first elongated aperture,
a pin member extends through said first elongated aperture and is attached to said upper portion, and wherein said first elongated aperture defines an upper cylindrical edge and a lower cylindrical edge and wherein a distance between said upper and lower cylindrical edges is the distance said valve member is able to vertically travel, and when said pin member abuts the upper cylindrical edge the valve stem is at its upper-most point and the stop is in sealing communications with the upper vent opening, and wherein moving said pin member to the lower cylindrical edge allows fluid communication between the stop and the upper vent opening.

5. The valve assembly of claim 4, and when said valve member is raised to the closed state, said upper portion is positioned within said sleeve to block a flow of gas from inside the chamber through a second aperture in said hollow sleeve to the upper vent opening, and when in the open state, said upper vent opening is in fluid communication with said chamber such that a gas flow path allows gas to escape from said chamber through said second aperture and through said upper vent opening.

6. The valve assembly of claim 4, further including an extension disposed on an exterior surface of said upper-most side, said extension in fluid communication with said upper vent opening and configured to capture gas flowing through said upper vent opening.

7. The valve assembly of claim 6, wherein said extension defines a central opening having a seal member that defines a sized aperture to allow the flow of gas therethrough, and wherein said central opening is in fluid communications with said upper vent opening.

8. The valve assembly of claim 7, further including a rod having a first end that passes through an aperture disposed in a lower portion of said valve stem and is pivotally mounted to an opposing arm, and a free end of said rod is attached to a buoyant float, and wherein said float configured to rise and fall with the level of the fluid within said chamber, wherein the buoyant float would rise in response to the fluid level rising within the chamber, and as the buoyant float rises the rod forces the valve stem to rise until the pin member is in communications with said upper edge, and wherein the buoyant float would drop in response to the fluid level dropping within the container, and, as the buoyant float lowers the rod causes the valve stem to lower thereby allowing fluid communication between the stop and the upper vent opening.

\* \* \* \* \*